March 26, 1935.    W. POLGAR    1,996,027
EXCAVATING SHOVEL AND THE LIKE
Filed Aug. 25, 1934    2 Sheets-Sheet 1
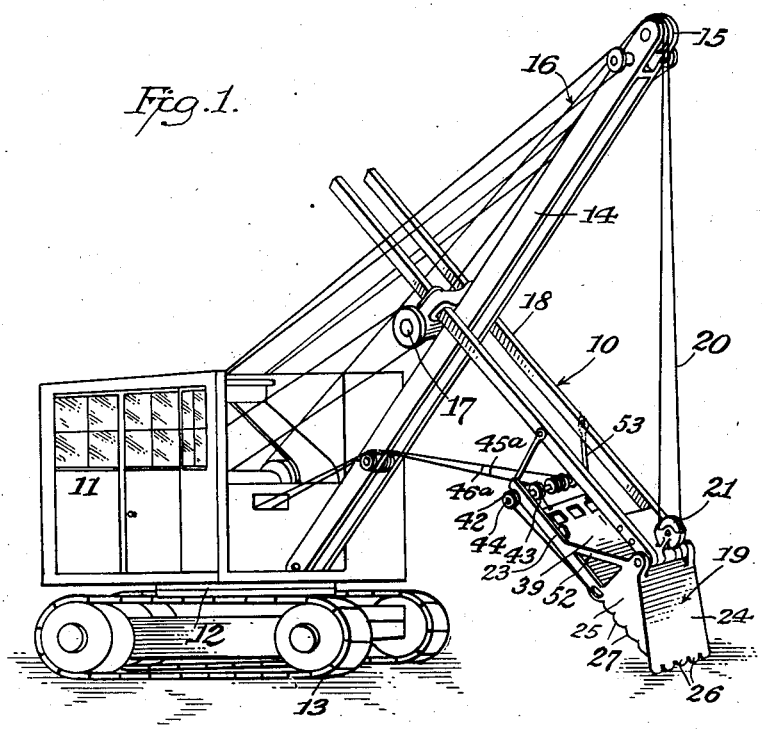
Fig. 1.
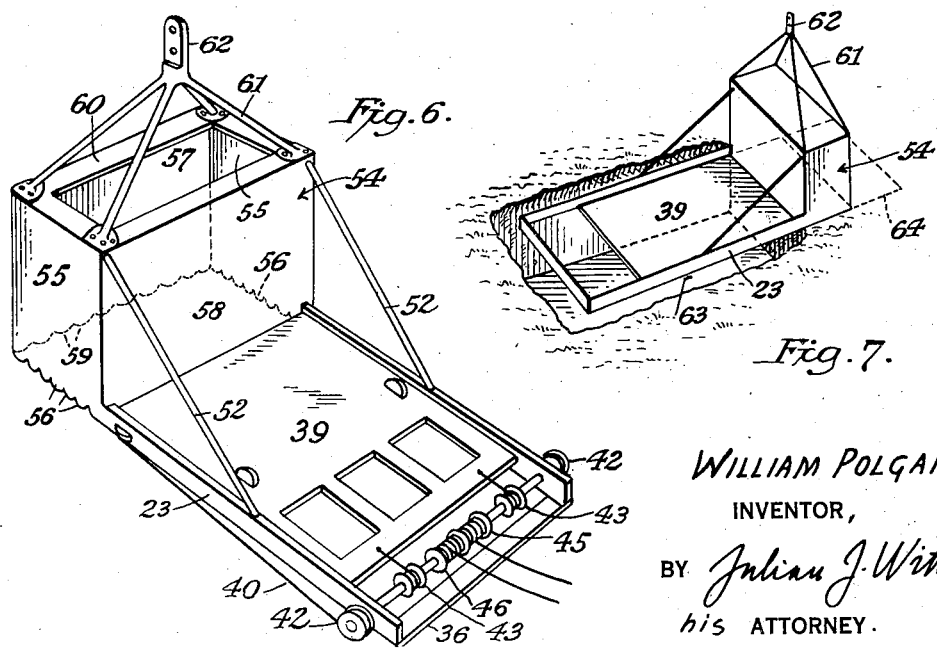
Fig. 6.
Fig. 7.
WILLIAM POLGAR,
INVENTOR,
BY Julian J. Wittal.
his ATTORNEY.

March 26, 1935. W. POLGAR 1,996,027
EXCAVATING SHOVEL AND THE LIKE
Filed Aug. 25, 1934 2 Sheets-Sheet 2
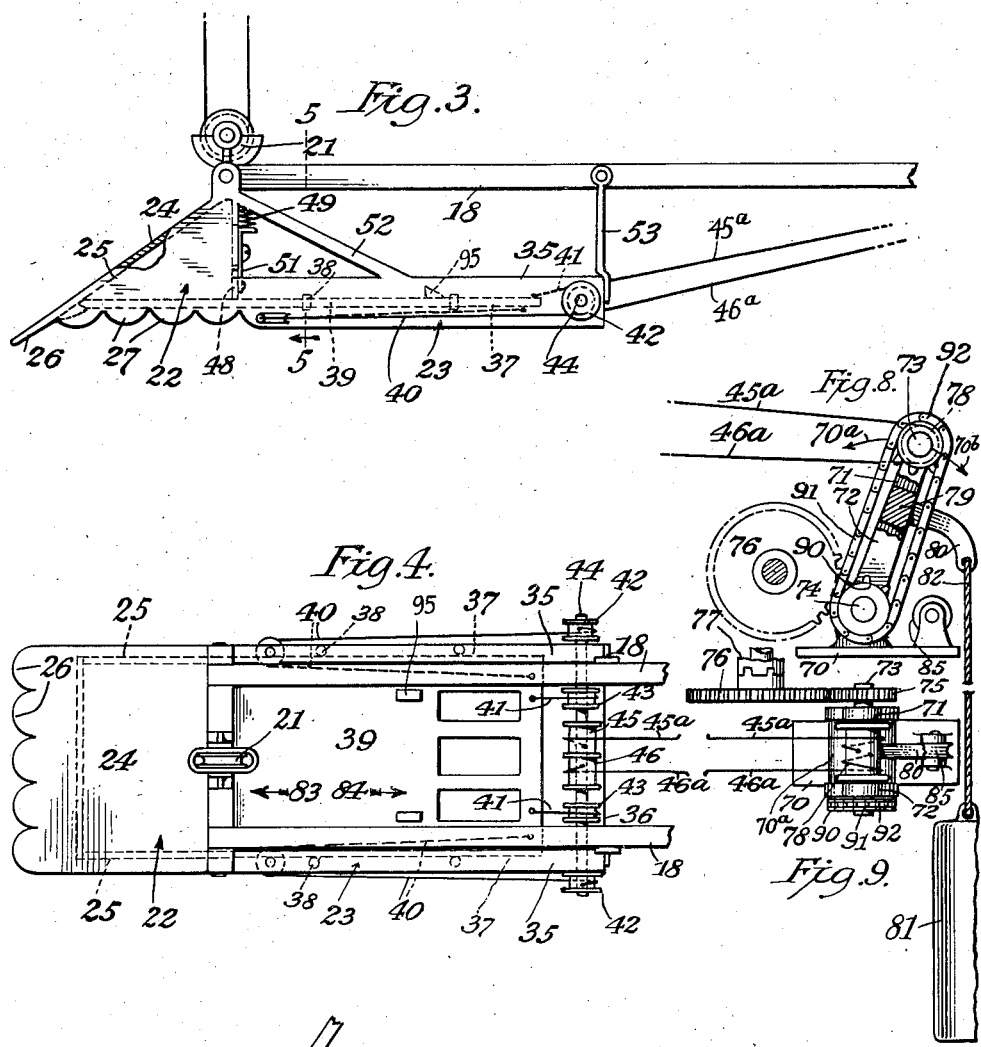
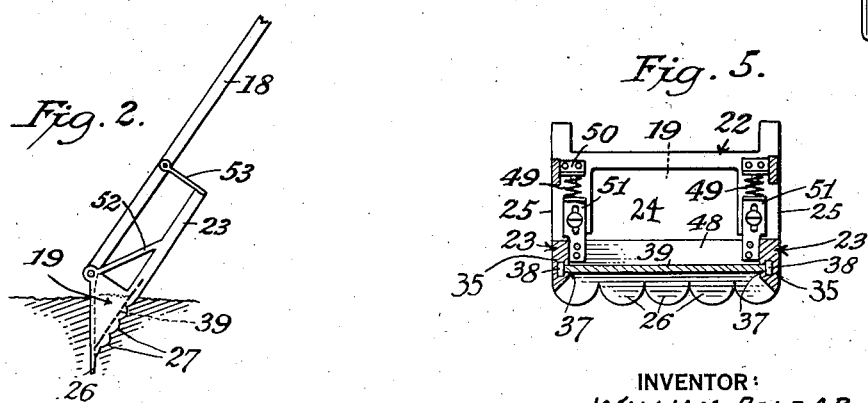
INVENTOR:
WILLIAM POLGAR,
BY Julian J. Wittal,
his ATTORNEY.

Patented Mar. 26, 1935

1,996,027

UNITED STATES PATENT OFFICE 1,996,027

EXCAVATING SHOVEL AND THE LIKE

William Polgar, Bronx, N. Y.

Application August 25, 1934, Serial No. 741,379

5 Claims. (Cl. 214—135)

This invention relates to excavating or digging shovels powered by the well known steam shovel equipment mounted on a rotating base supported by the crawler type of traveling means. A feature of the invention is to provide a shovel adapted to be fixed to the active or forward end portion of a swinging beam having gear connection with the boom of the equipment above identified; the shovel as seen in side elevation, having a triangular head formed with digging teeth at the lower edge of its front wall and at the lower edges of its side walls; the head being integrally formed with a shank portion for slidably supporting a gate and means for operating the gate to the closed and open position.

The object of the invention is to provide a shovel constructed to enter material to be removed, with a downward and backward camming action, simultaneously forcing cutting edges thereof into the material, while tilting the shovel and its shank, above the ground surface, forwardly and upwardly for accumulating a load within the shovel head prior to operating the gate through the mass of material to confine the load in said head, after which a lift rope is operated to raise the load and shovel beam, as is well known.

Some structural features herein are disclosed in a patent issued to me December 17th, 1929 "Mechanical collecting container for cranes", No. 1,740,116. This patent is directed to a dipper which is simply dropped onto or over a pile of snow, gravel, sand or other loose material, after which a slide is closed and the load lifted by a lift line; my present invention relating to an excavating shovel which is forced into the ground or other material for digging purposes.

I have, however, shown and described a modified form of shovel with vertical walls on three sides provided with cutting teeth; the head portion of this form is rectangular and has a shank portion in which a cut-off gate is slidable and the top of the head may be provided with a bracket for attachment to a suitable boom or other element for forcing the head into the ground to pick up a load as will hereinafter appear.

In the drawings:

Fig. 1 is a more or less diagrammatic perspective elevation showing my improved excavating shovel (with parts omitted), permanently secured to the beam of a conventional steam shovel equipment, including a boom; said shovel, beam and boom operable through the instrumentality of the usual rope crowd and power drums under the control of an operator.

Fig. 2 shows in diagram the position of the shovel and its beam at the extreme load gathering position.

Fig. 3 is an enlarged side elevation of the improved shovel, partly broken away to better illustrate the angularity of its front wall with respect to the shovel beam.

Fig. 4 is a plan view of the construction shown in Fig. 3, and showing further, the outer portions of a reversible cable drive for operating a cut-off gate in opposite directions.

Fig. 5 is a cross section of the shovel on about the line 5—5 of Fig. 3 with parts of the beam omitted.

Fig. 6 is a diagrammatic perspective of a modified form of my digging shovel in which a box-like head is employed with a shank portion for guiding a slidable gate and for supporting gate operating means; the lower edges of three of the head walls having cutting teeth and the upper portion of said head having a rigid bracket for connection with a beam, or the like for forcing the head downwardly into the material to be excavated.

Fig. 7 is a diagram showing how the earth's surface, or the surface of other material, is first dug out to form a pocket to receive the shank portion of this form of shovel, in making the initial entrance of said shovel into said material.

Fig. 8 is a fragmentary, partly sectional elevation of the inner portions of the said cable drive, while Fig. 9 is a fragmentary, semi-diagrammatical plan of the mechanism shown in Fig. 8.

Referring to Figs. 1 and 2 of the drawings 10 designates one type of a well-known steam shovel equipment comprising an operator's cabin 11, mounted for rotation on a platform 12, supported on crawlers 13 in the usual way. Hinged to the platform is a boom 14, having pulleys 15 at its free end over which the rope crowd 16 operates. The boom about midway of its length, carries a shipper shaft 17 and certain other elements for controlling the vertical angularity of the boom and for operating a shovel beam 18 on which my improved excavating shovel 19 is fixed, as is usual in the art, the details of these standard constructions not being shown in the drawings. A hoisting rope 20 traversing a pulley 21 serves to raise the shovel 19 when a load is gathered, as will be understood.

The excavating shovel 19 is shown more in detail in Figs. 3 to 5, and comprises, as shown in Fig. 3, a triangular head 22 and a backwardly extending shank 23; the head has a front wall 24, inclined downwardly and forwardly at about 45 degrees to the longitudinal line of the shank 23, but of course, this wall may have any desired angularity to the horizontal.

Formed with the front wall, are parallel side walls 25, and these walls are formed with cutting teeth, as shown at 26 and 27, respectively.

In carrying out my invention, I provide a simple yet strong, rigid means for connecting the shovel 19, to the active end of the shovel beam 18, as indicated in the drawings and as it is well known to those versed in this art.

The shank portion 23 of the excavating shovel is somewhat like that which is shown in the above referred to patent, with certain improvements which I will now proceed to describe.

This shank portion 23 comprises a rigid frame of parallel side rails 35 and a connecting end rail 36. The side rails have guide grooves 37 and rollers 38 through and on which a reciprocating gate 39 is operated by cables 40 and 41, traversing in opposite directions rollers 42 and 43, respectively, which are fixed on a reversible shaft 44 journalled in the side rails and having two further rollers 45 and 46 secured thereon between said rollers 43. Cables 45a and 46a are wound around the rollers 45 and 46, respectively, in opposite directions, the ends of said cables being secured to said rollers, respectively, so that a pull on one or the other cable 45a or 46a will rotate the shaft 44 in one or in the other direction. The gate or slide bottom 39 will be closed or opened by the action of the said cables as will be explained more in detail hereinafter.

A scraper 48, (Fig. 5) sweeps the upper face of the gate 39 free of interfering dirt particles by a yielding downward thrust on the gate, provided by suitable spiral springs 49, mounted between fixed and movable brackets 50 and 51 respectively.

I preferably provide rigid braces 52 at the sides to add strength to the shovel structure.

As clearly shown, the teeth 26 of the front wall 24 of the shovel project beyond or lower than the teeth 27 of the side walls to penetrate the ground first and act as an anchor or steadying influence, just prior to the entrance of the side teeth and to steady the power thrust of the shovel beam. The rear end of the shank 23 of the shovel is fixedly secured to the shovel beam by a link or links 53.

The above described cutting teeth 26—27 may be kept sharp for easy penetration and said teeth may be of the removable type if desired.

Fig. 6 shows another form preferably for digging foundation and irrigating trenches and comprises a rectangular shovel head 54 and the attached shank 23, as shown in the first described form.

The head 54 comprises two parallel side walls 55 having teeth 56 formed along their lower edges, and front and rear walls 57 and 58 respectively, the front wall only having teeth 59 formed at its lower edge. Of course, these teeth also may be of the removable type, if desired. The top 60 of the shovel head is partially open, as shown, to prevent air cushioning within said head and attached to the said top 60, is a rigid spider bracket 61, having means as at 62, for attachment to a beam or the like for forcing the shovel downwardly into the ground.

When using the shovel of Fig. 6, it is first necessary to provide a well or pit 63 in the surface to be excavated, for receiving the shank portion of the shovel when making the first thrust into the earth for gathering a load, after which the progressive gatherings define a continuous ditch or trench 64 in which the shank may be moved. If it is desired to dig laterally to the trench 64, appropriate space, like 63, may be provided laterally to said trench for the width of the trench 64 itself may be used for an initial positioning of the shovel head 54 transversely to the trench 64 and the digging continued in such a position thereof by advancing along the respective side of the trench 64.

I also may preferably make the form shown in Fig. 6 of my device rather broad or wide in its front edge 59 and shorter or narrower in its side digging edges 56 which, in my estimation, facilitate the application of the force of digging thereto, and it is also obvious that instead of the teeth 59 and 56 (or 26—27 in the earlier embodiment) straight cutting blades or edges may be used for the digging operation.

In Figs. 8 and 9, I show the mechanism to operate the sliding bottom or gate 39. In an appropriate place of the inside of the cabin 11, a base plate 70 is secured to a portion thereof on which are secured in a swinging or rocking manner two arms 71 and 72 in parallelism with one another and rockable in both directions shown by arrows 70a and 70b. The upper ends of said arms carry a shaft 73 journalled therein. A second shaft 74 is also journalled in an appropriate member 70a on the base plate 70 and said arms 71 and 72 are rockable around said shaft 74. One end of the shaft 74 carries a gear 75 in mesh with a larger gear 76, which gear is operated from the power plant or source of power in the cabin 11, through a clutch mechanism 77 of any of the well known appropriate designs for the operations to be described hereinafter. A drum 78 is secured on the upper shaft 73 between the arms 71 and 72 and the inner ends of the cables 45a and 46a are wound around said drum 78 in opposite directions, their ends being secured thereto. A heavy cross bar 79 is arranged between the two arms 71 and 72 below the drum 78, its ends being secured to said two arms and reliably connecting the same to one another, making one substantially H shaped, rigid, rockable frame therewith. An arm 80 is secured on said cross bar 79 or may be integral therewith, extending rearwardly and downwardly from the center thereof and a weight 81 may be secured, hanging from said arm 80 by the flexible rope or cable 82 which is led through appropriate guide rollers (not shown) in the inside of the cabin 11.

The opposite end of shaft 74 carries a sprocket 90 which transmits the rotation of said shaft through a chain 91 to a sprocket 92 secured on the corresponding end of the upper shaft 73.

The sliding bottom or gate 39 is shown in Fig. 3 and Fig. 4 as in an open position and, when it is desired to close the same, clutch 77 will be thrown into operation in one direction so that the drum 78 will be rotated in the sense of winding the cable 45a and unwinding the cable 46a. This will cause shaft 44 on the shank or frame 23 of the shovel head proper 19 to rotate in such a direction that the cables 41 will be unwound from their rollers 43 and the cables 40 will be wound on their rollers 42 which will cause the slide bottom 39 to move into a closing position in the direction of arrow 83, as will be obvious and as has been described in my patent for Mechanical collecting container for cranes, No. 1,740,116, referred to hereinabove. In case it is desired to open the slide bottom 39 the clutch 77 will be thrown into an operative position with the gear 76 in the reverse direction and all the mentioned rotations and movements of the drums, rollers and cables will be the reverse and the slide bottom or gate 39 will be moved in a reverse direction, as indicated by the arrow 84.

At the end of either operation the clutch 77 will be thrown into a neutral position, that is, not operating the gear 76 in either direction and the resistance in the mechanism will keep the gate 39 in either of its limit positions for which additional security may be provided, as it is well known in the art for such situations.

Before a new digging operation is started the gate 39 obviously will be placed into its open position, the steam shovel manoeuvered, as it is usual, and when a desired amount of material has been enclosed in its head, clutch 77 will be thrown into a position to close the gate 39, after which the clutch will again be thrown into a neutral position, the steam shovel moved as usual, and then the clutch thrown into a reverse position, opening the gate 39 and permitting the contents of the shovel head to be dropped therefrom. If during these operations an inward or outward movement of the shovel head is necessary in relation to the cabin 11, the swinging arms 71 and 72 will permit such movement, rocking outwardly (in the direction of arrow 70a) with the outward movement of the shovel head and being brought backwardly through the influence of the weight 81 (in the direction of arrow 70b) when the shovel head is moved inwardly and the cables 45a and 46a would become slackened. It is obvious that instead of the weight 81 an appropriate spring or other resilient, yielding means may be employed to have the same effect on the rocking arms 71 and 72. A separate roller 85 may be arranged to the rear of the rocking arms 71 and 72 to provide a rest for the cable 82 when the arms 71 and 72 are in their extreme forward position.

It will be seen that my device provides a steam shovel adapted for large operations, that is, for quickly and efficiently digging away large masses of material, like preparing a long canal, new river beds, and the like, and it also prevents any loss of material, it being completely closed after digging and while the material is moved in the shovel head.

It will be understood that changes and variations may be made in the parts and combinations of my device and I hereby reserve all my rights to any and all such changes as are within the spirit of the invention and the scope of the appended claims.

I also want to remark that projections or stops 95 may be provided on the slide gate 39 to limit its closing movement, as will be obvious, and so prevent its front knife edge from hitting its rest in the rear of the front wall 24 with such a force as to injure the same and that said gate or bottom 39 and its guide shank 23 are made rather long which will aid in their smooth and efficient operation.

What I claim as new, is:—

1. An excavating shovel comprising a forwardly declining front wall, parallel side walls and a shank portion; the front wall extending lower than the side walls; and cutting teeth supported by the lower edges of the said front and side walls.

2. An excavating shovel comprising a housing defined by a forwardly declining front wall having unitary cutting teeth at its forward edge, parallel substantially vertical side walls having unitary cutting teeth at their lower edges; a shank portion; a gate slidable therethrough and through said housing; a yielding scraper resting on said gate and means for imparting reciprocating movements to said gate.

3. An excavating shovel comprising a housing defined by front and side digging walls; the front wall extending lower than the side walls; cutting teeth on the bottom edges of said digging walls; a shank portion; a gate slidable in said shank portion and through said housing and means for operating said gate.

4. In combination with an excavating shovel having a movable shovel beam, a shovel head proper in the form of a downwardly open container having cutting edges at the lower ends of its walls for digging operations secured on said beam; a slide bottom gate for said head; cable means to operate said bottom; cable means to close said bottom; means to alternately actuate said opening or closing cables, said means including a yielding member allowing for the inward and outward movements of said shovel head.

5. In an excavating shovel as set forth in claim 4, said yielding member comprising an inwardly and outwardly rockable frame carrying a drum for the cables operating said slide bottom, and means to yieldingly force said frame in an inward direction but permitting its outward rocking.

WILLIAM POLGAR.